United States Patent
Miyake

(10) Patent No.: US 10,095,859 B2
(45) Date of Patent: Oct. 9, 2018

(54) AUTHENTICATION SYSTEM AND CAR ONBOARD CONTROL DEVICE

(71) Applicant: Hitachi Automotive Systems, Ltd., Hitachinaka-shi, Ibaraki (JP)

(72) Inventor: Junji Miyake, Ibaraki (JP)

(73) Assignee: Hitachi Automotive Systems, Ltd., Hitachinaka-shi (JP)

(*) Notice: Subject to any disclaimer, the term of this patent is extended or adjusted under 35 U.S.C. 154(b) by 135 days.

(21) Appl. No.: 15/120,782

(22) PCT Filed: Jan. 23, 2015

(86) PCT No.: PCT/JP2015/051755
§ 371 (c)(1),
(2) Date: Aug. 23, 2016

(87) PCT Pub. No.: WO2015/129352
PCT Pub. Date: Sep. 3, 2015

(65) Prior Publication Data
US 2016/0371481 A1    Dec. 22, 2016

(30) Foreign Application Priority Data
Feb. 28, 2014  (JP) .................... 2014-038125

(51) Int. Cl.
*G06F 21/44*  (2013.01)
*H04L 9/32*  (2006.01)
(Continued)

(52) U.S. Cl.
CPC .......... *G06F 21/445* (2013.01); *H04L 9/3228* (2013.01); *H04L 9/3273* (2013.01);
(Continued)

(58) Field of Classification Search
CPC ..... H04L 9/3228; H04L 9/3273; H04L 67/12; H04L 2209/84; G06F 21/00; G06F 21/30;
(Continued)

(56) References Cited

U.S. PATENT DOCUMENTS 7,602,915 B2 * 10/2009 Iwamura ............... H04L 9/0822
380/259
8,255,586 B2 * 8/2012 Choi ..................... G07C 5/008
710/16

(Continued)

FOREIGN PATENT DOCUMENTS

EP    1 895 444 A1    3/2008
JP    2001-225706 A   8/2001
(Continued)

OTHER PUBLICATIONS

Wikipedia, "Hash Chain" [Online], Nov. 15, 2013 [Retrieved on: Mar. 2, 2018], en.wikipedia.org, Internet Archive [web.archive.org], Retrieved from: < https://web.archive.org/web/20131115134055/https://en.wikipedia.org/wiki/Hash_chain > (Year: 2013).*

(Continued)

*Primary Examiner* — Eric W Shepperd
(74) *Attorney, Agent, or Firm* — Crowell & Moring LLP

(57) ABSTRACT

The present invention prevents a maintenance tool for carrying out maintenance work of an electronic control unit (ECU) from being abused by a third person. In an authentication system according to the present invention, an authentication apparatus authenticates an operator of an operation terminal (equivalent to the maintenance tool), and the operation terminal forwards an authentication code generated by the authentication apparatus to the ECU. By using the authentication code, the ECU determines whether or not to permit the operation terminal to carry out a maintenance operation.

15 Claims, 6 Drawing Sheets

(51) Int. Cl.
*H04L 29/06* (2006.01)
*H04L 29/08* (2006.01)

(52) U.S. Cl.
CPC ...... *H04L 63/0846* (2013.01); *H04L 63/0838* (2013.01); *H04L 67/12* (2013.01); *H04L 2209/84* (2013.01)

(58) Field of Classification Search
CPC ........ G06F 21/31; G06F 21/44; G06F 21/445; G06F 21/45; G06F 21/57; G06F 21/62; G06F 21/70; G06F 21/71
See application file for complete search history.

(56) References Cited

U.S. PATENT DOCUMENTS

| | | | |
|---|---|---|---|
| 9,450,937 B2* | 9/2016 | Mabuchi | H04L 9/3271 |
| 9,577,997 B2* | 2/2017 | Mabuchi | H04L 67/12 |
| 2001/0002814 A1 | 6/2001 | Suganuma et al. | |
| 2003/0009271 A1* | 1/2003 | Akiyama | G06F 21/335 |
| | | | 701/29.6 |
| 2006/0041337 A1 | 2/2006 | Augsburger et al. | |
| 2007/0192849 A1* | 8/2007 | Golle | G06F 21/34 |
| | | | 726/16 |
| 2011/0047630 A1* | 2/2011 | Cheng | H04L 9/3234 |
| | | | 726/34 |
| 2011/0083161 A1* | 4/2011 | Ishida | H04L 12/40 |
| | | | 726/2 |
| 2012/0079288 A1* | 3/2012 | Hars | G06F 21/00 |
| | | | 713/193 |
| 2013/0111582 A1 | 5/2013 | Forest | |
| 2013/0159717 A1* | 6/2013 | Rabadi | G06F 21/572 |
| | | | 713/176 |
| 2013/0179692 A1* | 7/2013 | Tolba | H04L 63/08 |
| | | | 713/179 |
| 2013/0219170 A1* | 8/2013 | Naitou | H04L 63/0428 |
| | | | 713/153 |
| 2014/0037092 A1* | 2/2014 | Bhattacharya | G07C 9/00174 |
| | | | 380/259 |
| 2014/0075517 A1* | 3/2014 | Alrabady | G06F 21/572 |
| | | | 726/4 |
| 2014/0114497 A1* | 4/2014 | Miyake | H04L 9/32 |
| | | | 701/1 |
| 2015/0163306 A1* | 6/2015 | Nakagawa | B60R 25/2018 |
| | | | 709/225 |
| 2018/0063098 A1* | 3/2018 | Robins | H04L 63/0471 |

FOREIGN PATENT DOCUMENTS

| | | |
|---|---|---|
| JP | 2013-15884 A | 1/2013 |
| JP | 2013-192091 A | 9/2013 |

OTHER PUBLICATIONS

Extended European Search Report issued in counterpart European Application No. 15754771.2 dated Sep. 13, 2017 (7 pages).

International Search Report (PCT/ISA/210) issued in PCT Application No. PCT/JP2015/051755 dated Apr. 14, 2015 with English translation (Two (2) pages).

Japanese-language Search Report (PCT/ISA/237) issued in PCT Application No. PCT/JP2015/051755 dated Apr. 14, 2015 (Four (4) pages).

* cited by examiner

AUTHENTICATION SYSTEM AND CAR ONBOARD CONTROL DEVICE

TECHNICAL FIELD

The present invention relates to a technique for authenticating an operation terminal used for maintaining an electronic control unit (ECU) that controls operation of a vehicle. As used herein the terms SDL and CPU mean specification and description language, and central processing unit, respectively.

BACKGROUND ART

In recent years, an ECU includes software that is sophisticated and large-scaled, and control processing thereof is multifunctional. Consequently, in general, it is added with functions for carrying out a maintenance operation such as a function for setting data for adjustment, a debugging function, and a function for updating control software itself. The maintenance operation is carried out by connecting the ECU with an external operation terminal and by allowing an operator to operate the operation terminal (also called a maintenance tool). The ECU reads data from a storage device thereof and outputs the data to the operation terminal or acquires data from the operation terminal and writes the data in the storage device thereof.

As the data that is read from the storage device of the ECU by the maintenance tool, for example, there is data for carrying out troubleshooting such as a self-diagnosis history and an operation log. As the data that is written in the storage device of the ECU by the maintenance tool, for example, there are a device adjustment value, which is different for each vehicle, written by a manufacturer before a product shipment, update data for updating the control software (rewriting of firmware) written by a dealer that is specified by the manufacturer after the product shipment, and the like. Work of updating the control software is sometimes carried out as a recall or a service campaign. Such maintenance function is permitted only to a manufacturer, a dealer having a maintenance factory permitted by the manufacturer, and the like and is not released to a general user.

In particular, due to a characteristic of the ECU of controlling an automobile, an easy change of the software or the data may lead to a failure or an accident. Furthermore, from a viewpoint of information security as well, the easy change may threaten a personal property existing on the vehicle. For example, invalidating an electronic key may facilitate a vehicle theft. There is also a possibility that personal information such as data of one's own house stored in a navigation system is collected. In addition, there is also a possibility that a personal credit number may be stolen from an electronic toll collection system (ETC) device. Thus, the maintenance tool should not be leaked to a general user and should not be operable by an unqualified person.

In the technique described in PTL 1, the maintenance tool has a function of measuring position information, and an authentication server authenticates the maintenance tool only in a case where the maintenance tool exists in a predetermined range of latitude and longitude. By checking the position information of the maintenance tool, for example, even in a case where the maintenance tool is stolen, it aims at preventing the maintenance tool from being used by a malicious third person.

CITATION LIST

Patent Literature

PTL 1: JP 2013-015884 A

SUMMARY OF INVENTION

Technical Problem

<Increased Price and Decreased Efficiency of the Tool>

According to the above-described PTL 1, as in a conventional technique, a part of a constituent element of the authentication system is stored inside the maintenance tool. That is, to sophisticate the authentication system, a function enhancement of hardware (e.g. an addition of a position information measurement function and the like) is required, whereby it is considered that a cost of the maintenance tool may increase. Furthermore, since it is necessary to measure a position of the maintenance tool, a lead time required for starting a maintenance work by the operator may also increase.

<Fear of Reverse Engineering>

In the above-described PTL 1, a secret key for a message authentication code (MAC) used for communicating with a center, which issues an authentication code, is stored inside the maintenance tool. Accordingly, in a case where the maintenance tool is stolen, there is a possibility that the secret key may be leaked due to reverse engineering.

<Reliability of Positioning System>

In recent years, due to advancement in an indoor messaging system (IMES) using a global positioning system (GPS), there has been publicly-known a commercially-available GPS signal generator capable of being abused for a purpose of camouflaging position information. Furthermore, as a different method of attacking, there is the following fact. From a viewpoint of suppressing a cost increase, it is considered that a general-purpose (commercially-available) GPS receiving module is used as a GPS receiver inside the maintenance tool. Such GPS receiving module has a standardized interface with a central processing unit (CPU) of the tool, and a communication protocol in conformity with a standard specification of the National Marine Electronics Association (NMEA) 0183 is used. The NMEA 0183 is a character-based communication standard specified by the NMEA. Thus, by camouflaging a signal that is sent from the GPS receiving module to the CPU of the maintenance tool based on the above-described standard, it is possible to easily camouflage the position information. Accordingly, reliability of a positioning result is shaken.

<Vulnerability of a Function (Hash Function) for Converting a Challenge into a Response>

According to the above-described PTL 1, at the interface for transmitting the signal from a target device to the maintenance tool, it is possible to capture and monitor a challenge generated by the target device. It is also possible to capture and monitor a response corresponding to this at the interface for transmitting a signal from the center to the maintenance tool. Thus, a third person who has illegally obtained the maintenance tool can record a set of the challenge and the response. This may give a clue for guessing an internal Hash function, whereby it may become vulnerable for a security system. Furthermore, in the above-described PTL 1, the target device generates a pseudo-random number when generating the challenge; however, since the pseudo-random number has periodicity (unlike a cryptographic true-random number), there is a possibility that the response is camouflaged by recording all sets of the challenge and the response of one period. Still furthermore, in a case where a pseudo-random number generation mechanism is common among another vehicles/ECUs, it is possible to use an above-described brute force attack on other vehicles.

The present invention has been devised in view of the above-described problem, and an objective thereof is to prevent a maintenance tool for carrying out a maintenance work of an ECU from being abused by a third person.

Solution to Problem

In an authentication system according to the present invention, an authentication apparatus authenticates an operator of an operation terminal (equivalent to the maintenance tool), and the operation terminal forwards an authentication code generated by the authentication apparatus to the ECU. By using the authentication code, the ECU determines whether or not to permit the operation terminal to carry out a maintenance operation.

Advantageous Effects of Invention

In the authentication system according to the present invention, it is not necessary to store authentication information or an authentication mechanism inside the operation terminal, whereby even in a case where the operation terminal is lost or stolen, it is possible to suppress a risk of being abused by a third person.

DESCRIPTION OF EMBODIMENTS

First Embodiment

Figure 1:
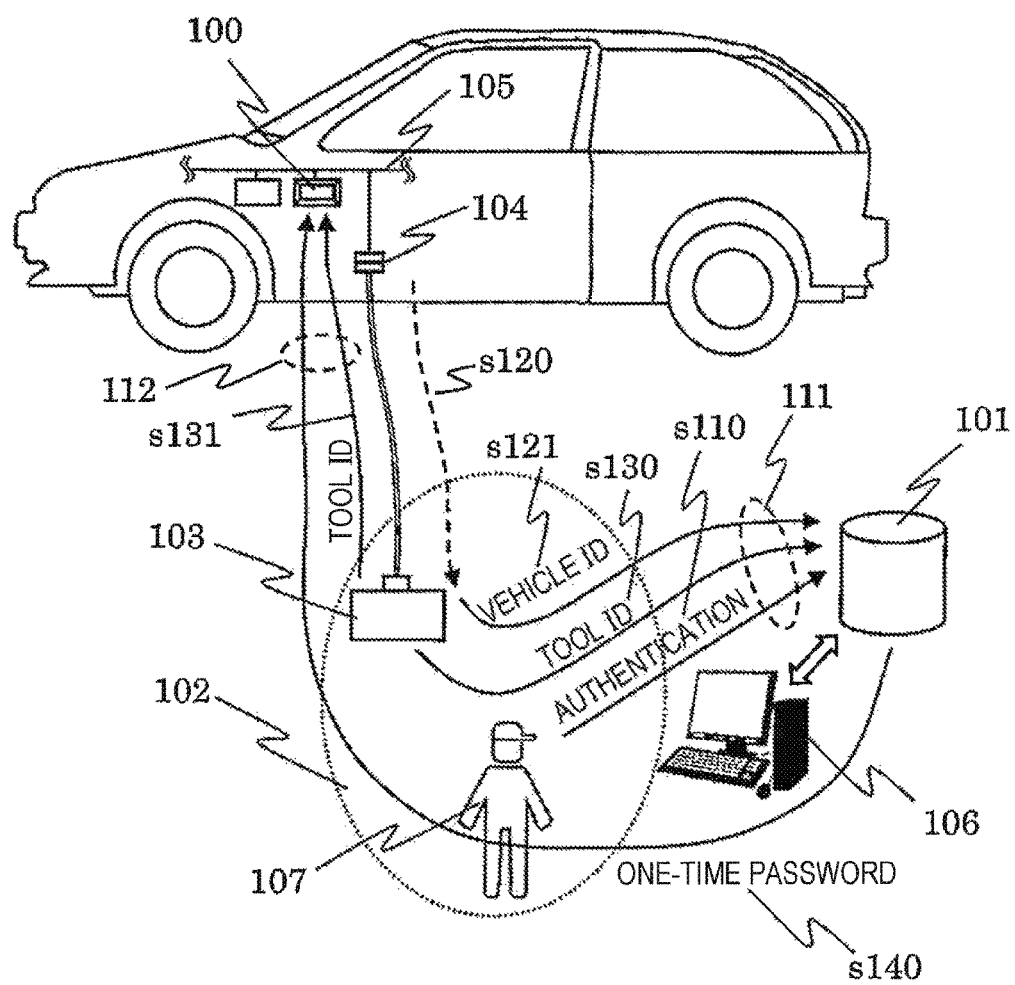
FIG. 1 is a view illustrating a configuration of an authentication system according to a first embodiment.

FIG. 1 is a view illustrating a configuration of an authentication system according to a first embodiment of the present invention.

An electronic control unit 100 is a so-called built-in type electronic control device referred to as an ECU that is connected to an in-vehicle network 105 such as a controller area network (CAN) and that controls a vehicle by sending and receiving data to and from another ECU.

The maintenance tool 103 is capable of connecting to the in-vehicle network 105 through a connector 104 for connection. The connector 104 for the connection may be directly diverged from the in-vehicle network 105 or may be provided through an in-vehicle communication gateway (not illustrated) from a security consideration.

In a conventional method of authenticating the maintenance tool 103, in general, the ECU 100 and the maintenance tool 103 are authenticated one on one. However, in such case, information required for authentication is stored inside the maintenance tool 103, whereby in a case where the maintenance 103 tool is stolen or lost, a malicious third person may use the authentication information to make an illegal access to the in-vehicle network 105.

Thus, in the first embodiment, the ECU 100 does not authenticate the maintenance tool 103 but personally authenticates an operator 107 who operates the maintenance tool 103. Accordingly, since it is not necessary for the maintenance tool 103 to hold the authentication information, the authentication information is not leaked even in a case where the maintenance tool 103 is stolen or lost, whereby it is considered that security strength can be further enhanced.

Since the maintenance tool 103 does not hold the authentication information, it is necessary to separately provide a means for personally authenticating the operator 107. To provide a function for authenticating the operator 107 inside the ECU 100, it is necessary to provide an authentication database to the ECU 100 as well as to provide a man-machine interface such as a keyboard to a chassis and the like of the ECU 100, whereby it is not realistic. Thus, the authentication system according to the first embodiment is provided with an authentication server 101 connected to the maintenance tool 103 through a communication line, and the authentication server 101 is provided with a first authentication unit 111 that personally authenticates the operator 107.

The first authentication unit 111 receives a signal s110 described below, and by using the signal, it checks whether or not the operator 107 is a person who is authorized to operate the maintenance tool 103. As for an authentication method, for example, it may be an authentication method using a user ID and a password or an authentication method using a lightweight directory access protocol (LDAP) in link with working hours control or work control of the operator 107. Any other appropriate authentication method may be used.

As the man-machine interface (keyboard or the like) used by the operator 107 to provide the authentication information, for example, it is possible to use a personal computer 106 for business use connected to the authentication server 101 or to use the man-machine interface such as a software keyboard on the maintenance tool 103 by connecting the maintenance tool 103 directly to the authentication server 101. In any of the cases, since the maintenance tool 103 does not hold any authentication information by itself, it is necessary to separately provide the authentication information for personally authenticating the operator 107.

When the authentication server 101 is successful in personally authenticating the operator 107, the authentication server 101 collects a signal s121 describing a vehicle ID specifying a vehicle to be worked on and a signal s130 describing a tool ID specifying the maintenance tool 103. This information may be given by the operator 107 through the personal computer 106 for business use, or the information may be stored inside the maintenance tool 103 in advance, and the maintenance tool 103 may send it without human intervention by directly connecting to the authentication server 101.

In addition to this information, by using information that fluctuates synchronized with the ECU 100 (details to be described below), the authentication server 101 generates a signal s140 describing a one-time password for authentication and issues the one-time password to the maintenance tool 103. As a form of issuance, the one-time password may be once issued to the personal computer 106 for business use, and the operator 107 may transfer it to the maintenance tool 103 through a media such as a memory card (not illustrated), or the maintenance tool 103 may acquire the one-time password by directly connecting to the authentication server 101.

The operator 107 connects the maintenance tool 103, which has obtained the one-time password for authentication (s140), to the ECU 100 through the connector 104 for the connection and the in-vehicle network 105.

The maintenance tool 103 sends the one-time password for authentication (s140) and a signal s131 describing a tool ID specifying the maintenance tool 103 to the ECU 100. The ECU 100 is provided with a second authentication unit 112 that authenticates the maintenance tool 103. The second authentication unit 112, after the authentication server 101 authenticates the operator 107 (that is, by using the one-time password issued by the authentication server 101), authenticates the maintenance tool 103 following a procedure described below. Through this procedure, it is verified whether or not the operator 107 has an authority to carry out a maintenance work on the ECU 100.

In a case where a verification result is OK, the ECU 100 permits the maintenance tool 103 to carry out a maintenance operation.

The one-time password for authentication (s140) issued from the first authentication unit 111 to the second authentication unit 112 is a one-time password valid only in the vicinity of the time of issuance or in sole timing of issuance. Thus, even when the one-time password is copied, it cannot be reused for another authentication, whereby there is an advantage that a so-called reply attack cannot be used.

The first authentication unit 111 may be constituted of, for example, software executed by a CPU of the authentication server 101 or hardware such as a circuit device mounted with the same function. The second authentication unit 112 is equivalent to an authentication code generator 220 described below.

<First Embodiment>: Operation Sequence

Figure 2:
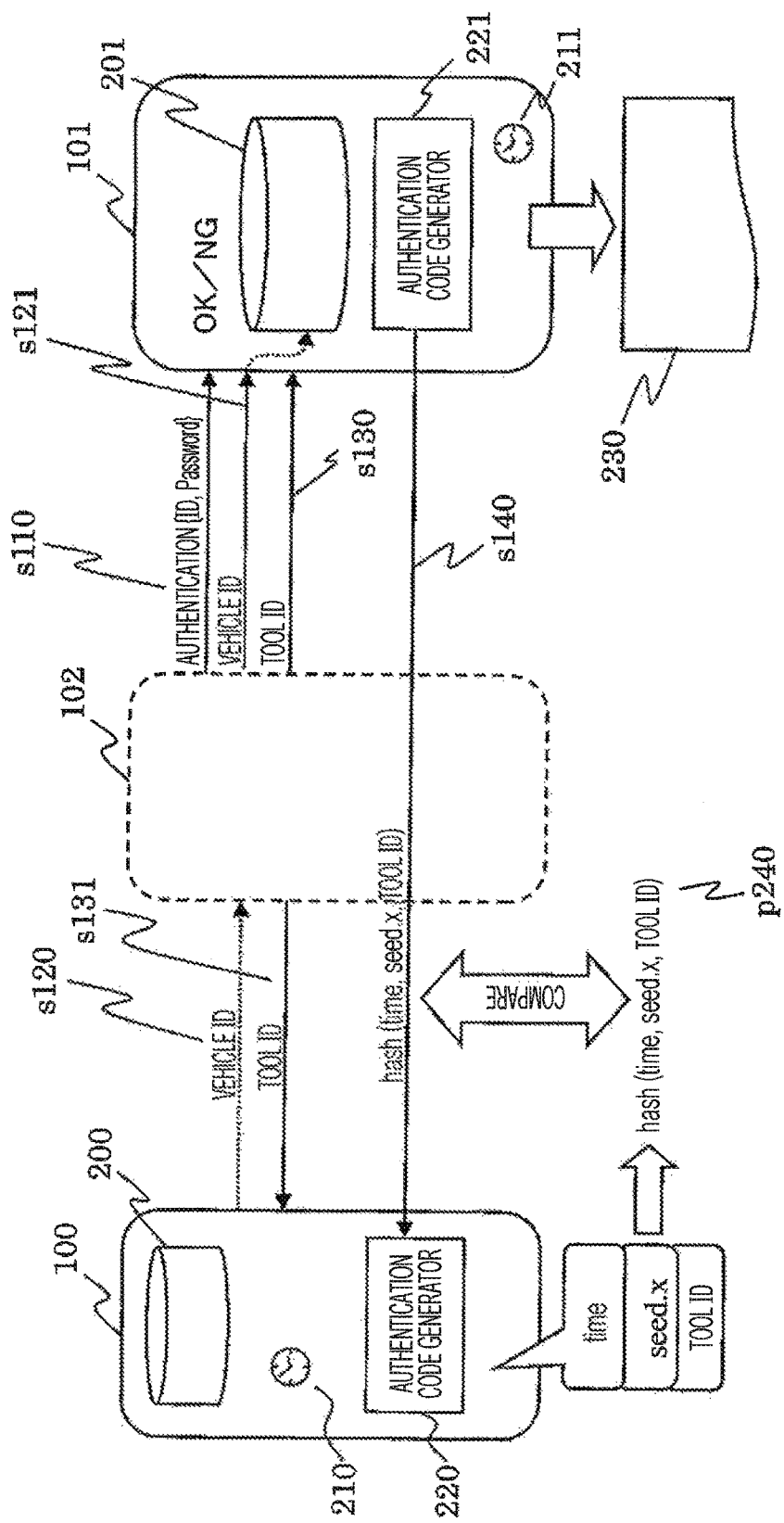
FIG. 2 is a sequence diagram illustrating operation for authenticating a maintenance tool 103 by the authentication system according to the first embodiment.

FIG. 2 is a sequence diagram describing operation for authenticating the maintenance tool 103 by the authentication system according to the first embodiment. In FIG. 2, for convenience of description, operation of the maintenance tool 103 and operation of the operator 107 (or, a terminal such as the personal computer 106 for business use used by the operator 107) are integrated and are described as an activity 102. Hereinafter, each step of FIG. 2 is described.

The activity 102 sends personal authentication information: s110 of the operator 107 to the authentication server 101. When the authentication server 101 completes the personal authentication, it requests the activity 102 to send a vehicle ID: s121 and a tool ID: s130. The activity 102 sends the information to the authentication server 101.

The vehicle ID: s121 may be information that uniquely identifies a vehicle to be worked on or may be information that uniquely identifies the ECU 100 to be worked on. As a means for collecting the vehicle ID, the vehicle ID may be acquired by observing a frame number engraved on a frame by the operator 107 or by connecting the maintenance tool 103 to the ECU 100, or may be acquired as identification information (illustrated as a vehicle ID: s120 in FIG. 2) that can be collected during the time the authentication is not carried out from the ECU 100. That is, as described below, it may be information that enables searching of a passcode unique to the vehicle from a database 201 inside the authentication server 101.

The authentication server 101 is provided with the database 201 storing a set of the vehicle ID of each vehicle and the passcode corresponding to the vehicle ID for every vehicle. The database 201 may be constituted of a storage device such as a hard disk device. The storage device authentication server 101 searches through the database 201 by using the vehicle ID: s121 to find a passcode seed.x corresponding to the vehicle. The same passcode as this passcode is also stored inside a storage device 200 inside the ECU 100, whereby the CPU of the ECU 100 may refer to this. The passcode seed.x is held only by the authentication server 101 and the ECU 100 and serves as a secret key not disclosed to others.

Each of the authentication server 101 and the ECU 100 is respectively provided with clocks 211 and 210 synchronized to each other as changing code generation sources that generate changing codes synchronized to each other. Each of the authentication server 101 and the ECU 100 is also respectively provided with authentication code generators 221 and 220 that generate authentication codes by using the same Hash function. The authentication server 101 uses the time of the clock 211: time, the passcode seed.x, and the tool ID: s130 to calculate a Hash value Hash (time, seed.x, tool ID) and issues it as a one-time password: s140. The above-described three values are bit-connected and are substituted into a Hash function Hash ( ) as one bit string.

The Hash function Hash ( ) is a cryptographic function having the following (1) to (3) characteristic and that compresses data of an arbitrary length to data of a fixed length (about 128 to 512 bits):

(1) Unidirectional: it is difficult to find an input value from an output value. That is, when one Hash value h is given, it is required that obtaining an arbitrary m satisfying h=Hash (m) is difficult; (2) second preimage resistance: it is difficult to obtain another input that gives the same Hash value as one input value. That is, for one m, it is required that obtaining an m' (however, m≠m') such that Hash (m)=Hash (m') is difficult; (3) collision resistance: it is difficult to find two input values that generate the same output value. That is, it is required that finding m and m' that satisfy Hash (m)=Hash (m') (however, m≠m') is difficult.

The authentication code generators 221 and 220 confidentially shares the same Hash function Hash ( ). By changing the Hash function Hash ( ) in a set between the authentication server 101 and the ECU 100, it is possible to enhance encryption strength and to deal with insecurity. The maintenance tool 103 only forwards the one-time password: s140, whereby the activity 102 is not affected even when the Hash function Hash ( ) is changed. That is, replacement or repair of the maintenance tool 103 is not necessary. Note that the insecurity of an encryption refers to a situation in which a safety level of an encryption algorithm is lowered or, due to an influence thereof, a situation in which safety of a system and the like incorporating the encryption algorithm is threatened.

In the ECU 100, the authentication code generator 220 substitutes the tool ID: s131 sent from the maintenance tool 103, a passcode seed.x unique to the vehicle, and the time of the clock 210: time into the Hash function Hash ( ) that is the same as that for the authentication server 101, and the authentication code generator 220 calculates the Hash value Hash (time, seed.x, tool ID) (p240).

The authentication code generator 220 compares the calculated Hash value with the one-time password: s140 acquired from the maintenance tool 103. In a case where both match with each other, the authentication code generator 220 permits the maintenance work verifying that authenticity of the activity 102 is determined.

During the time from when the authentication server 101 issues the one-time password: s140 to when the ECU 100 generates the Hash value, each of the time of the clocks 211 and 210 need to be the same. For example, each of the clocks 211 and 210 generates the time that periodically changes in minutes or in hours, and the time of each of the clocks is not to be changed during one period thereof. A sequence for authenticating the maintenance tool 103 may be carried out while the time of each of the clocks is not changed. In a case where the time advances from when the authentication server 101 issues the one-time password: s140 to when the ECU 100 generates a Hash value, it is necessary to return to a step in which the authentication server 101 issues the one-time password: s140 and to carry out the authentication sequence once again.

The authentication server 101 can collect a log 230 based on information acquired from the activity 102. In the log 230, it is possible to record information such as a person ID of the operator 107, one-time password issue time, the vehicle ID, and the tool ID. In a case where any illegal act is detected, this information serves as a material that specifies the operator 107 and an affected vehicle.

The clock 210 on an ECU 100 side is not necessarily mounted on the ECU 100. For example, in a case where it is possible to inquire the time to another ECU through the in-vehicle network 105, it is also possible to reuse it. As a means for synchronizing it with the clock 211 on the authentication server 101 side, there are considered, for example, receiving of a GPS signal, an access to a network time protocol (NTP) server on the Internet, and the like.

Figure 3:
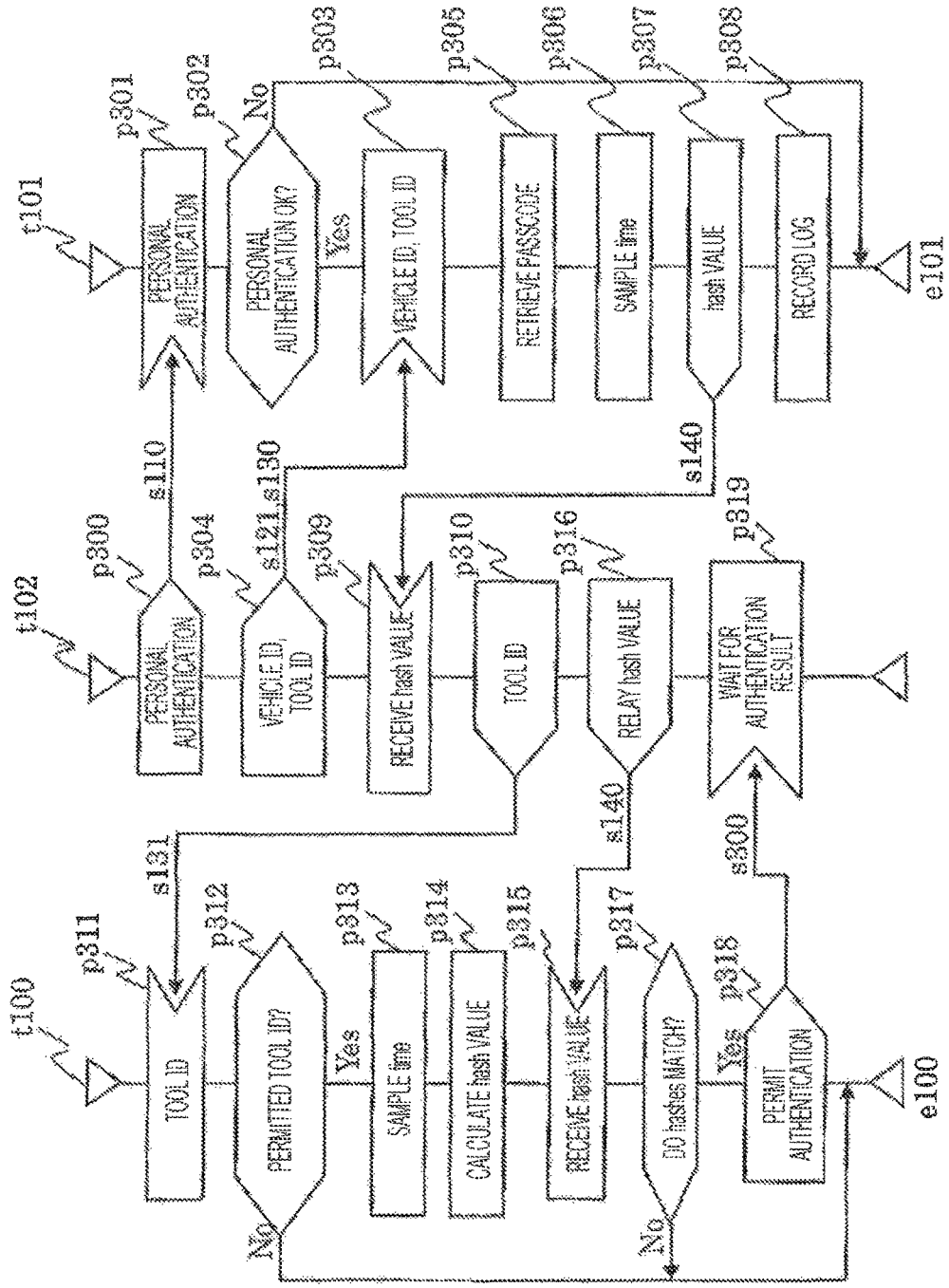
FIG. 3 is an SDL flowchart illustrating the sequence of FIG. 2.

In FIG. 3, the sequence of FIG. 2 is illustrated as a specification and description language (SDL) flowchart. In FIG. 3, there are illustrated a flow t100 of the ECU 100, a flow t102 of the activity 102, and a flow t101 of the authentication server 101 as well as event transmission and information giving and receiving therebetween with arrows. Hereinafter, based on FIG. 3, operation of each device is described in chronological order. In FIG. 3, a small character t indicates a flow tree, a small character p indicates a process, a small character s indicates a signal, and a small character e indicates end of processing (end process).

(FIG. 3: Processes p300 to p302)

The activity 102 issues personal authentication information: s110 of the operator 107 to the authentication server 101 (p300). By using the personal authentication information: s110, the authentication server 101 carries out a personal authentication (p301). In a case where the personal authentication is successful, the flow shifts to the next process. In a case where it fails, the flow shifts to an end process e101, and the flow is ended (p302).

(FIG. 3: processes p303 to p304)

The authentication server 101 requests the activity 102 to send the vehicle ID: s121 and the tool ID: s130 (p303). The activity 102 sends these signals to the authentication server 101 (p304).

(FIG. 3: Processes P305 to P308)

The authentication code generator 221 searches the passcode (seed.x) by using the vehicle ID acquired from the activity 102 (p305). The authentication code generator 221 samples the time of the clock 211: time (p306). The authentication code generator 221 generates the one-time password: s140 and sends the one-time password to the activity 102 (p307). The authentication code generator 221 outputs the log 230 (p308).

(FIG. 3: Processes P309 to P310)

The maintenance tool 103 receives the Hash value sent from the authentication server 101 and stores it as a server Hash value (p309). The maintenance tool 103 sends the tool ID: s131 to the ECU 100 (p310).

(FIG. 3: Processes P311 to P312)

By receiving the tool ID sent from the maintenance tool 103, the ECU 100 regards that there is an authentication request from the maintenance tool 103 and starts an authentication process thereafter (p311). The authentication code generator 220 checks whether or not the tool ID received from the maintenance tool 103 matches with the tool ID stored inside the storage device 200 in advance (p312). In a case where they do not match with each other, it is regarded that the maintenance tool 103 is misconnected, and the flow shifts to an end process e100, and the flow chart is ended (authentication is rejected). In a case where they match with each other, the flow shifts to a process p313.

(FIG. 3: Processes P313 to P314)

The authentication code generator 220 samples the time of the clock 210: time (p313). The authentication code generator 220 substitutes the passcode (seed.x), the time: time, and the tool ID stored in the storage device 200 in advance into the Hash function Hash ( ) to calculate the Hash value (p314).

(FIG. 3: Processes P315 to P316)

The authentication code generator 220 waits until the one-time password: s140 is sent from the maintenance tool 103 (p315). The maintenance tool 103 forwards the one-time password: s140, which has been received from the authentication server 101, to the ECU 100 (p316).

(FIG. 3: Process P317)

The authentication code generator 220 determines whether or not the one-time password: s140, which has been received from the maintenance tool 103, matches with the Hash value calculated in the process p314. In a case where they match, the flow shifts to a process p318, and in a case where they do not match, the flow shifts to the end process e100, whereby the flowchart is ended (authentication is rejected).

(FIG. 3: Processes P318 to P319)

The authentication code generator 220 sends the signal s300 indicating that the authentication has been permitted to the maintenance tool 103 (p318). The maintenance tool 103, after the process p316, waits for the signal s300, and once it receives the signal s300, it starts the maintenance operation determining that the authentication is permitted (p319). In a case where the Hash value generated by the authentication code generator 220 does not match with the one-time password: s140, the authentication code generator 220 notifies it in the process p318 by using the signal s300.

<First Embodiment>: Summary

As above, in the authentication system according to the first embodiment, a common key and a common Hash function required for the authentication processing are held only by the ECU 100 and the authentication server 101, and these are not held by the maintenance tool 103. Accordingly, a cost for managing the maintenance tool 103, a cost for enhancing the security of the maintenance tool 103, a cost for disposing the maintenance tool 103 that has become unnecessary without any information leak and the like are unnecessary. Furthermore, by changing the encryption strength by a vehicle type and a model year of the vehicle, it is possible to immediately deal with insecurity of the encryption.

In the authentication system according to the first embodiment, the maintenance tool 103 does not hold the authentication information, the secret key, and the like, whereby disclosure thereof to a tool vendor (a manufacturer of the maintenance tool 103) is not necessary. From a viewpoint of preventing dispersion of confidential information, it may be said that reducing information confidentially shared between a manufacturer of the ECU 100 and the tool vendor is a desirable form of transaction compared to a conventional form thereof.

In the authentication system according to the first embodiment, the authentication server 101 does not authenticate a main body of the maintenance tool 103 by using the authentication information held by the maintenance tool 103 but carries out the personal authentication on the operator 107. Accordingly, even in a case where a plurality of operators 107 uses the same maintenance tool 103, an authentication authority may be controlled for each of the operators 107. Furthermore, since the personal authentication is carried out on the operator 107, the authentication server 101 is capable of taking an access record for each of the operators 107 (work record of the ECU 100). Accordingly, it is possible to give an effect of restraining an unauthorized access.

In the first embodiment, the authentication code generators 220 and 221 generate a Hash value by using the tool ID of the maintenance tool 103; however, it is always necessary to use the tool ID. That is, the Hash value may be generated by omitting the processes (p310 to p312) of sending the tool ID from the maintenance tool 103 to the ECU 100 and by substituting the time and the passcodes of the clocks 210 and 211 into the Hash function. This is the same in the below-described embodiments.

Second Embodiment

In the first embodiment, the clocks 210 and 211, which are synchronized to each other, are used as the changing code generation sources that generate the changing codes being changed in synchronization between the ECU 100 and the authentication server 101. In a second embodiment of the present invention, in place of the clocks 210 and 211, received data that is received by the ECU 100 and the authentication server 101 in a synchronized manner may be used. As one example of the received data of the second embodiment, it is possible to use data regularly distributed in a road-to-vehicle communication such as intelligent transport systems (ITS) as a common knowledge.

Figure 4:
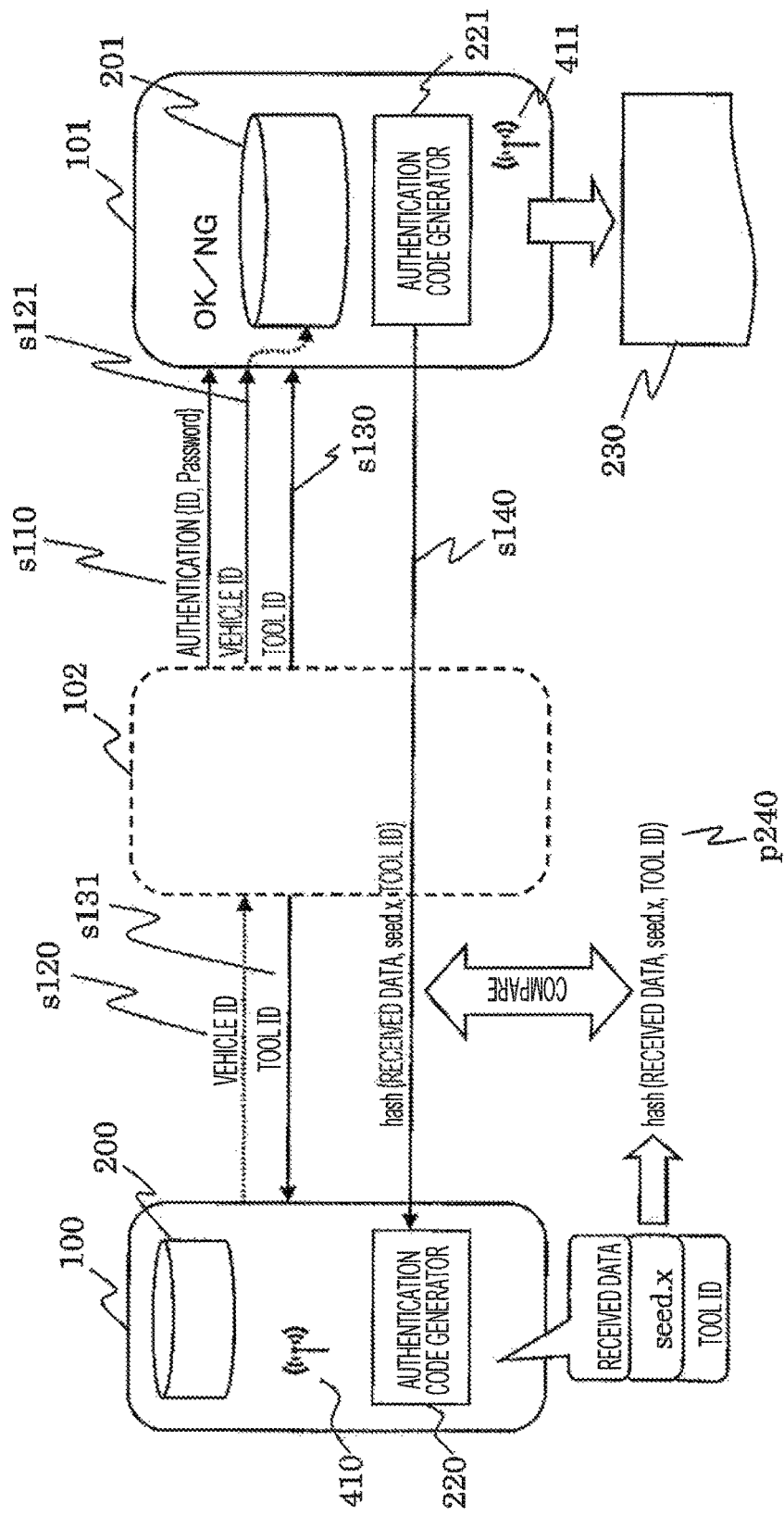
FIG. 4 is a sequence diagram illustrating operation for authenticating a maintenance tool 103 by an authentication system according to a second embodiment.

FIG. 4 is a sequence diagram illustrating operation for authenticating a maintenance tool 103 by an authentication system according to the second embodiment. In FIG. 4, authentication code generators 220 and 221 use received data 410 and 411 in place of the time of the clocks 210 and 211. Thus, both of the authentication code generator 221 and the authentication code generator 220 generate a Hash value by Hash (received data, seed.x, tool ID). This Hash value is valid until the received data is updated.

In the second embodiment, an SDL flowchart corresponding to FIG. 4 is substantially the same as that of FIG. 3; however, the processes p306 and p313 are replaced with the processes of referencing the received data 410 and 411. Any other configuration and process are the same as those of the first embodiment.

It is not always necessary that a means for acquiring the received data 410 used by the ECU 100 is mounted on the ECU 100, and for example, it is possible to reuse the data as long as it is possible to inquire another ECU (navigation ECU and the road-to-vehicle communication ECU) through an in-vehicle network 105. It is not always necessary that a means for acquiring the received data 411 used by the authentication server 101 be the same as the means for acquiring the received data 410 used by the ECU 100 as long as it is guaranteed that the received data 410 and 411 are synchronized to each other.

Third Embodiment

In a third embodiment of the present invention, as a changing code that changes being synchronized between an ECU 100 and an authentication server 101, the number of times authentication processing is carried out is used in place of clocks 210 and 211. That is, authentication code generators 220 and 221 apply a Hash function Hash ( ) superimposingly on an initial value init.x of a passcode every time the authentication processing is carried out, and a value obtained as a result is used in place of the time: time and the passcode seed.x of the first embodiment.

In the third embodiment, the authentication code generators 220 and 221 use {Hash (init.x)} ^n in place of the time: time and the passcode seed.x of the first embodiment. This is equivalent to obtaining the following value: {Hash (init.x)} ^n=Hash (Hash ( . . . Hash (init.x) . . . )) when an initial value of the passcode is init.x, and the number of times of authentication is n. This value is equivalent to a value obtained by carrying out an n-fold Hash processing on the init.x.

Figure 5:
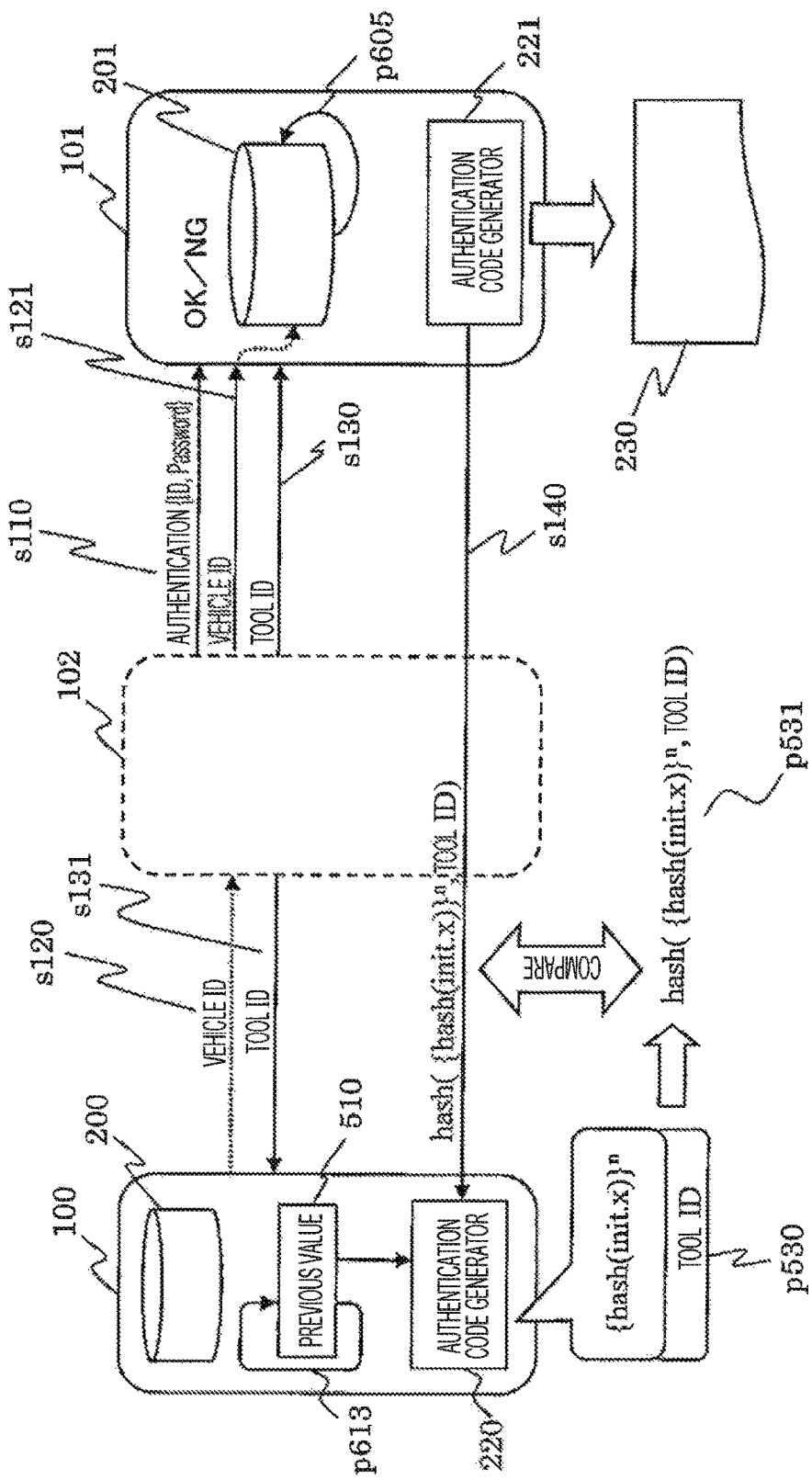
FIG. 5 is a sequence diagram illustrating operation for authenticating a maintenance tool 103 by an authentication system according to a third embodiment.

FIG. 5 is a sequence diagram illustrating operation for authenticating a maintenance tool 103 by an authentication system according to the third embodiment. Hereinafter, a configuration different from the first embodiment is mainly described.

In the third embodiment, a database 201 stores, for every vehicle, a set of a vehicle ID of each vehicle, an initial value of a passcode corresponding to the vehicle ID, and the number of times an operator 107 is authenticated. When the authentication server 101 is successful in a personal authentication of the operator 107, it acquires a vehicle ID: s121 from an activity 102 and increments the number of times of authentication corresponding to the vehicle ID (from (n−1) to n) (p605).

The authentication code generator 221 reads the initial passcode init.x corresponding to the vehicle ID and superimposingly applies a Hash function n times thereto to calculate {hash (init.x)} ^n (described below in p606). The authentication code generator 221 uses the value in place of the passcode and the time of the first embodiment. Thus, a one-time password: s140 generated by the authentication server 101 becomes Hash ({Hash (init.x)} ^n, tool ID).

In the third embodiment, a storage device 200 stores the initial passcode init.x, which is the same as that of the database 201. Note, however, that in general, the ECU 100 is not provided with a calculation power such as that of the authentication server 101, whereby it is difficult to calculate {Hash (init.x)} ^n every time. Thus, each time the Hash function is superimposingly applied to init.x, the authentication code generator 220 stores the value as a previous value 510 in the storage device 200 (p613), and next time an authentication code is generated, the Hash function Hash ( ) is applied only once to the previous value 510. Accordingly, it is possible to generate a series of passcodes with a calculation amount smaller than that of the authentication server 101.

After obtaining a value to which the Hash function is superimposingly applied to init.x, the authentication code generator 220 generates the authentication code in the same way as the authentication code generator 221 by using the value and a tool ID (p530 to p531). The authentication code generator 220 compares this authentication code with the one-time password: s140.

Figure 6:
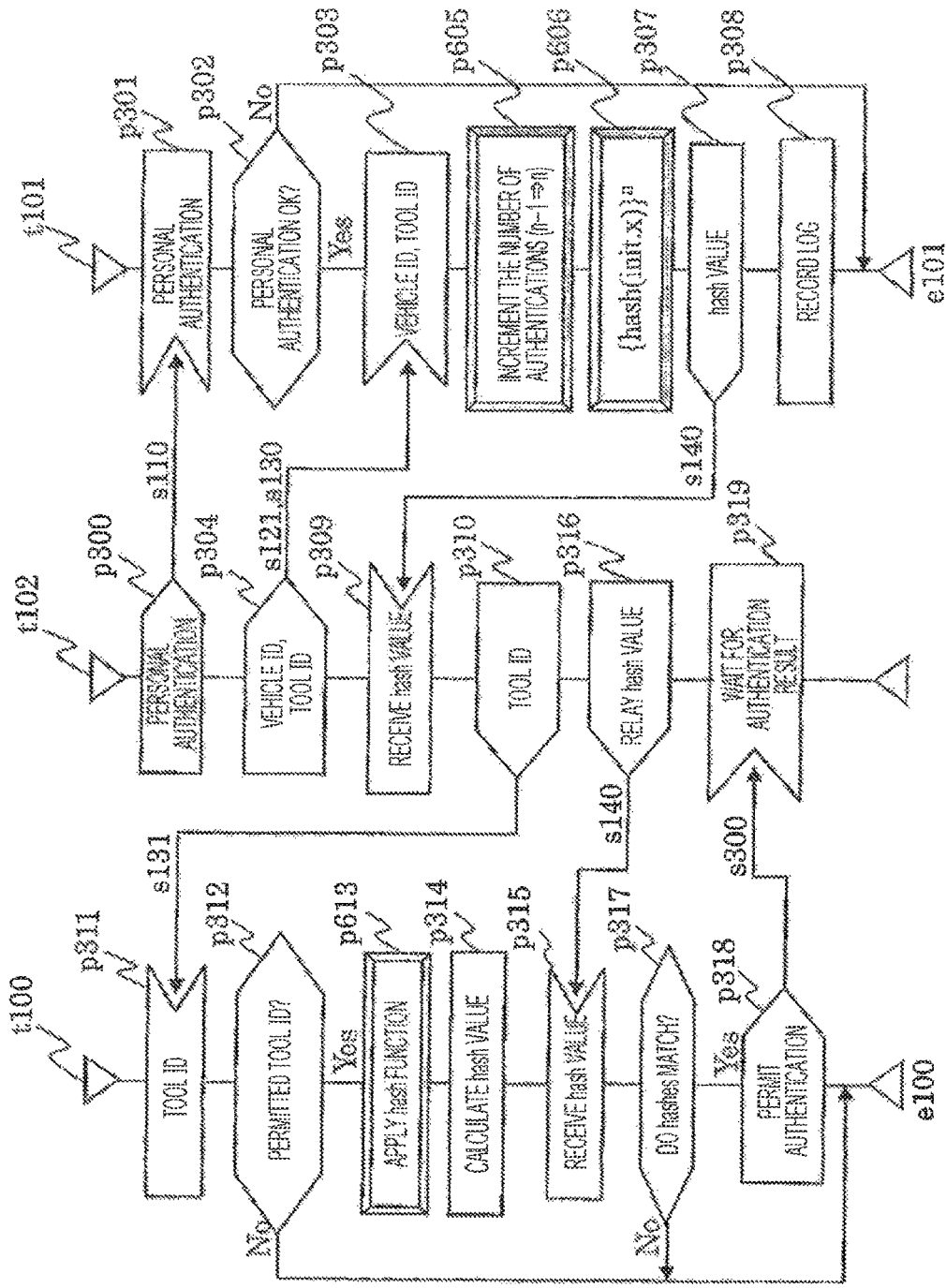
FIG. 6 is an SDL flowchart illustrating the sequence of FIG. 5.

FIG. 6 is an SDL flowchart illustrating a sequence of FIG. 5. Processes p605 to p606 are provided in place of the processes p305 to p306 of FIG. 3, and a process p613 is provided in place of the process p313. The processes p606 and p613 are processing for obtaining the same value to which the Hash function is superimposingly applied to init.x; however, in p606, the Hash function is applied n times while in p613, the Hash function is applied only once to the previous value 510.

In the process p319, in a case where the maintenance tool 103 receives a signal s300 indicating that an authentication is rejected, it may forward this to the authentication server 101. When the authentication server 101 receives the signal, the next time the operator 107 is authenticated, it carries out appropriate processing such that the one-time password: s140 is generated by using the number of times of authentication that is prior to being incremented. For example, it is possible to directly decrement the number of times of the authentication stored in the database 201, or by increasing or decreasing the value of the number of times of authentication and the like when generating the one-time password: s140, it is possible to attempt authentication multiple times by using the plurality of values by generating a plurality of one-time passwords: s140.

<Third Embodiment>: Summary

As above, in the authentication system according to the third embodiment, the authentication code generators 220 and 221 synchronize the number of times the authentication processing is carried out with each other and generates the authentication code by using this. Accordingly, it is not necessary to use information that changes in time such as the clocks 210 and 211 of the first embodiment as well as the received data 410 and 411 of the second embodiment, whereby a means for synchronizing may be simplified.

The present invention is not limited to the above-described embodiments and may include various modifications. The above-described embodiments are described in detail to make the present invention understandable, and it is not to be necessarily limited to embodiments provided with whole configuration. Furthermore, it is possible to replace a part of a configuration of one embodiment with a configuration of another embodiment. Furthermore, it is also possible to add the configuration of the other embodiment to the configuration of one embodiment. Still furthermore, a part of the configuration of each of the embodiments may be added with, deleted, or replaced with another configuration.

A part or all of each of the above-described configuration, function, processing unit, processing means, and the like may be achieved, for example, by hardware by designing with an integrated circuit and the like. Each of the above-described configuration, function, and the like may also be achieved by software by interpreting and executing a program for achieving each of the functions by a processor. Information of a program, a table, a file, and the like for achieving each of the functions may be stored in a recording device such as a memory, a hard disk, and a solid state drive (SSD) or in a recording medium such as an IC card, an SD card, and a DVD.

For example, a means for acquiring the authentication code generators 220 and 221, the clocks 210 and 211, and the received data 410 and 411 may be constituted of the hardware such as a circuit device implemented with such function or of the software implemented with an identical function that is executed by a CPU of the authentication server 101 or the ECU 100.

REFERENCE SIGNS LIST

100: ECU, 101: authentication server, 103: maintenance tool, 104: connector for the connection, 105: in-vehicle network, 107: operator, 200: storage device, 201: database, 210 and 211: clock, 220 and 221: authentication code generator, 410 and 411: received data.

The invention claimed is:

1. An authentication system configured to authenticate an operation terminal used for maintaining an electronic control unit (ECU) controlling operation of a vehicle, the authentication system comprising:
    an authentication apparatus connected to the operation terminal through a communication line and configured to authenticate an operator operating the operation terminal; and
    the ECU, wherein
    the ECU is configured to determine whether or not to permit the operation terminal to carry out operation for maintaining the ECU,
    each of the authentication apparatus and the ECU includes:
        a changing code generation source configured to generate a changing code synchronized to each other;
        a storage unit configured to store a common key unique to the vehicle and shared between the authentication apparatus and the ECU; and
        an authentication code generator configured to generate an authentication code by using the changing code and the common key,
    the authentication apparatus authenticates the operator upon receiving an authentication request from the operation terminal,
    once an authentication of the operator is successful, acquires information specifying the common key from the operation terminal, generates the authentication code by using the changing code and the common key and sends the authentication code to the operation terminal,
    the operation terminal sends the authentication code received from the authentication apparatus to the ECU, and
    the ECU generates the authentication code by using the changing code and the common key, and in a case where the authentication code having been generated and the authentication code having been received from the operation terminal match with each other, permits the operation terminal to carry out the operation for maintaining the ECU.

2. The authentication system according to claim 1, wherein
    the changing code generation source generates a time being synchronized between the authentication apparatus and the ECU as a changing code, and
    by applying a Hash function shared between the authentication apparatus and the ECU to the changing code and the common key, the authentication code generator generates a one-time password as the authentication code.

3. The authentication system according to claim 1, wherein
the changing code generation source uses information capable of being received by the authentication apparatus and the ECU and being synchronized therebetween as the changing code, and
the authentication code generator generates a one-time password as the authentication code by applying a Hash function shared between the authentication apparatus and the ECU to the changing code and the common key.

4. The authentication system according to claim 1, wherein
the changing code generation source uses information specifying the number of times the authentication code has been generated by the authentication code generator as the changing code, and
the authentication code generator uses, in place of the changing code and the common key, a superimposition code obtained by applying the Hash function shared between the authentication apparatus and the ECU to the common key by the number of times of superimposition and generates a one-time password as the authentication code.

5. The authentication system according to claim 4, wherein
the authentication code generator stores the number of times the authentication code has been generated in the storage unit, and when generating the authentication code next time, uses, in place of the changing code and the common key, the superimposition code obtained by applying the Hash function shared between the authentication apparatus and the ECU to the common key by the number of times of storage.

6. The authentication system according to claim 4, wherein
the authentication code generator stores the superimposition code in the storage unit, and when generating the authentication code next time, uses, in place of the changing code and the common key, a superimposition code obtained by applying the Hash function shared between the authentication apparatus and the ECU only once to the superimposition code having been stored and stored again.

7. The authentication system according to claim 4, wherein
in a case where the authentication code having been generated do not match with the authentication code having been received from the operation terminal, the authentication code generator of the ECU sends authentication error data notifying thereof to the operation terminal, and
the operation terminal forwards the authentication error data to the authentication apparatus.

8. The authentication system according to claim 1, wherein
the authentication code generator provided to each of the authentication apparatus and the ECU generates the authentication code by using a terminal ID unique to the operation terminal in addition to the changing code and the common key.

9. An ECU configured to control operation of a vehicle, the ECU comprising:
a changing code generation source configured to generate a changing code changing in synchronization with a changing code generated by an authentication apparatus authenticating an operator operating an operation terminal being used for maintaining the ECU;
a storage unit configured to store a common key being shared between the authentication apparatus and the ECU and being unique to the vehicle; and
an authentication code generator configured to generate an authentication code by using the changing code and the common key, wherein
the authentication code generator receives the authentication code from the operation terminal,
generates the authentication code by using the changing code and the common key, and in a case where the authentication code having been generated and the authentication code having been received from the operation terminal match with each other, permits the operation terminal to carry out operation for maintaining the ECU.

10. The ECU according to claim 9, wherein
the changing code generation source generates a time having been synchronized between the authentication apparatus and the ECU as the changing code, and
the authentication code generator generates a one-time password as the authentication code by applying a Hash function shared between the authentication apparatus and the ECU to the changing code and the common key.

11. The ECU according to claim 9, wherein
the changing code generation source uses information capable of being received by the authentication apparatus and the ECU and being synchronized therebetween as the changing code, and
the authentication code generator generates a one-time password as the authentication code by applying a Hash function shared between the authentication apparatus and the ECU to the changing code and the common key.

12. The ECU according to claim 9, wherein
the changing code generation source uses information specifying the number of times the authentication code has been generated by the authentication code generator as the changing code, and
the authentication code generator uses, in place of the changing code and the common key, a superimposition code obtained by applying the Hash function shared between the authentication apparatus and the ECU to the common key the number of times of superimposition and generates a one-time password as the authentication code.

13. The ECU according to claim 12, wherein
the authentication code generator stores the superimposition code in the storage unit, and when generating the authentication code next time, uses, in place of the changing code and the common key, the superimposition code obtained by applying the Hash function shared between the authentication apparatus and the ECU only once to the superimposition code having been stored and stored again.

14. The ECU according to claim 12, wherein
in a case where the authentication code having been generated do not match with the authentication code having been received from the operation terminal, the authentication code generator sends authentication error data notifying thereof to the operation terminal.

15. The ECU according to claim 9, wherein
the authentication code generator generates the authentication code by using a terminal ID unique to the operation terminal in addition to the changing code and the common key.

* * * * *